US008550778B2

(12) United States Patent
Koyabu et al.

(10) Patent No.: US 8,550,778 B2
(45) Date of Patent: Oct. 8, 2013

(54) COOLING SYSTEM OF RING SEGMENT AND GAS TURBINE

(75) Inventors: Hidemichi Koyabu, Tokyo (JP); Satoshi Hada, Tokyo (JP); Junichiro Masada, Tokyo (JP); Keizo Tsukagoshi, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 644 days.

(21) Appl. No.: 12/763,723

(22) Filed: Apr. 20, 2010

(65) Prior Publication Data

US 2011/0255989 A1    Oct. 20, 2011

(51) Int. Cl.
*F01D 5/18*    (2006.01)

(52) U.S. Cl.
USPC ........................................ 416/97 R; 415/115

(58) Field of Classification Search
USPC ................. 415/115, 116; 416/97 R
See application file for complete search history.

(56) References Cited

U.S. PATENT DOCUMENTS

| | | | | | |
|---|---|---|---|---|---|
| 4,317,646 | A | * | 3/1982 | Steel et al. | 415/116 |
| 4,526,226 | A | * | 7/1985 | Hsia et al. | 415/116 |
| 4,551,064 | A | * | 11/1985 | Pask | 415/116 |
| 4,573,865 | A | * | 3/1986 | Hsia et al. | 415/115 |
| 5,165,847 | A | * | 11/1992 | Proctor et al. | 415/115 |
| 5,169,287 | A | * | 12/1992 | Proctor et al. | 415/115 |
| 6,139,257 | A | * | 10/2000 | Proctor et al. | 415/115 |
| 6,270,311 | B1 | | 8/2001 | Kuwabara et al. | |
| 6,899,518 | B2 | * | 5/2005 | Lucas et al. | 415/116 |
| 7,033,138 | B2 | | 4/2006 | Tomita et al. | |
| 7,147,432 | B2 | * | 12/2006 | Lowe et al. | 415/116 |
| 7,284,954 | B2 | | 10/2007 | Parker et al. | |
| 2004/0047725 | A1 | | 3/2004 | Tomita et al. | |

FOREIGN PATENT DOCUMENTS

JP    11-22411 A    1/1999

(Continued)

OTHER PUBLICATIONS

Written Opinion of the International Searching Authority issued in International Application No. PCT/JP2010/002835.

(Continued)

*Primary Examiner* — Igor Kershteyn
(74) *Attorney, Agent, or Firm* — Westerman, Hattori, Daniels & Adrian, LLP

(57) ABSTRACT

In a cooling system of ring segment that cools a ring segment of a gas turbine, the segment body of the ring segment is constituted from a collision plate that has a small hole that blows out cooling air, a cooling space that is enclosed by the collision plate and the main body of the segment body; a first cavity that receives the cooling air from the cooling space; and a first cooling passage, of which one end communicates with the first cavity, and the other end blows out the cooling air from openings that are arranged in the side end portion into combustion gas; the openings of the first cooling passages being arranged so that the arrangement pitch of the openings becomes smaller or the opening area of the openings becomes larger on the upstream in the flow direction of the combustion gas than the openings on the downstream, and are arranged so that the arrangement pitch of the openings becomes larger or the opening area of the openings becomes smaller on the downstream in the flow direction of the combustion gas than the openings on the upstream.

14 Claims, 14 Drawing Sheets

(56) References Cited

FOREIGN PATENT DOCUMENTS

| | | |
|---|---|---|
| JP | 2000-257447 A | 9/2000 |
| JP | 2004-100682 A | 4/2004 |
| JP | 2004-534178 A | 11/2004 |
| JP | 2005-155626 A | 6/2005 |
| JP | 2010-065634 A | 3/2010 |

OTHER PUBLICATIONS

International Search Report of PCT/JP2010/002835, date of mailing Aug. 3, 2010.
Written Opinion of the International Searching Authority issued in International Application No. PCT/JP2010/002835, Aug. 3, 2010.

* cited by examiner

COOLING SYSTEM OF RING SEGMENT AND GAS TURBINE

BACKGROUND OF THE INVENTION

1. Field of the Invention

The present invention relates to a cooling system of ring segment that is applied to a gas turbine, and to a gas turbine.

2. Description of Related Art

Conventionally, since combustion gas of a high temperature and high pressure passes through the turbine section of a gas turbine, which is used in the generation of electrical energy, cooling of the ring segment and the like is important in order to continue stabilized operation. In particular, due to improvements in the thermal efficiency of gas turbines in recent years, the temperature of combustion gas continues to increase, and so further enhancement of the cooling performance is required.

FIG. 10 shows a block diagram of a conventional gas turbine. In it a gas turbine 1 is constituted by a compressor 2 that compresses air for combustion, a combustor 3 that injects fuel FL into the compressed air that is sent from the compressor 2, causes a combustion, and generates combustion gas, a turbine section 4 that is positioned on the downstream of this combustor 3 in the flow direction of the combustion gas and driven by the combustion gas that has left the combustor 3, a generator 6, and a rotating shaft 5 that integrally connects the compressor 2, the turbine section 4, and the generator 6.

FIG. 11 is a cross-sectional view that shows the internal structure relating to the turbine section 4 of the gas turbine.

The gas turbine supplies combustion gas FG generated in the combustor 3 to a turbine vane 7 and a turbine blade 8, and by causing the turbine blades 8 to rotate around the rotating shaft 5, converts rotational energy into electrical power. The turbine vanes 7 and the turbine blades 8 are alternately disposed from the upstream to the downstream in the flow direction of the combustion gas (in the direction from the left side to the right side on the sheet of FIG. 11). Moreover, a plurality of turbine blades 8 is disposed in the circumferential direction of the rotating shaft 5, and thus rotates together with the rotating shaft 5.

FIG. 12 is an essential portion cross-sectional view of a conventional ring segment. The ring segment 60 is formed from a plurality of segment bodies 61 that is disposed in an annular shape in the circumferential direction of the rotating shaft 5, and as a whole forms a circular shape centered on the rotating shaft 5. Each segment body 61 is supported by a casing 67 via hooks 62 and a isolation ring 66. Moreover, a collision plate 64 that is supported from the isolation ring 66 is provided with a plurality of small holes 65, and cooling air CA that is supplied to the casing 67 blows out to below from the small holes 65, and carries out impingement cooling of the upper surface of the main body of the segment body 61. Also, in the segment body 61, a plurality of cooling passages 63 is disposed in the axial direction of the rotating shaft 5, and the cooling air flows in the axial direction inside the main body of the segment body 61, and performs convection cooling of the segment body 61. Also, the ring segment 60 is disposed annularly on the outer periphery side of the turbine blades 8 centered on the rotating shaft 5, and between the ring segment 60 and the tip of the turbine blades 8, a certain tip clearance is provided in order to avoid mutual interference. Note that a downstream end face 69 of the segment body 61 on the downstream in the flow direction of the combustion gas is positioned further on the downstream in the flow direction of the combustion gas than the trailing edge TE of the rotating turbine blades 8.

FIG. 13 is a perspective view of the ring segment 60 shown in FIG. 12. In this example, openings 33 are arrayed in the side end portion 70 of the segment body 61 along the axial direction of the rotating shaft 5 (in the direction from the lower left side to the upper right side on the sheet of FIG. 13). When cooling air after impingement cooling of the main body of the segment body 61 is supplied to a cooling passage (not illustrated) that is provided in the side end portion 70, and blown out from the openings 33 into the combustion gas, it performs convection cooling of the side end portion 70.

In order to cool the ring segment 60, cooling air that is a portion of the extracted air of the compressor 2 is supplied from the supply hole of the casing 67 to each segment body 61 of the ring segment 60. The cooling air is blown into a cooling space 71 that is enclosed by the collision plate 64 and the segment body 61 via the small holes 65 that are opened in the collision plate 64, and performs impingement cooling of the upper surface of the main body of the segment body 61 (the surface in contact with the cooling space). The cooling air after the impingement cooling is blown from the downstream end face of the segment body 61 in the flow direction of the combustion gas via the cooling passage 63 into the combustion gas, and the main body of the segment body 61 is convection cooled by the cooling air. Also, by discharging a portion of the cooling air from the openings 33 that are disposed along the side end portion 70 into the combustion gas, the side end portion 70 of the segment body 61 is convection cooled.

Patent Document 1 discloses one example of the aforementioned cooling system of ring segment.

CITATION LIST

Patent Document

[Patent Document 1] Japanese Unexamined Patent Document No. 2004-100682

SUMMARY OF THE INVENTION

Problem that the Invention is to Solve

In the turbine section, the pressure of the combustion gas that passes through the outer circumference of the turbine vanes and the turbine blades gradually decreases in the process of flowing from the upstream to the downstream in the flow direction of the combustion gas, while converting the thermal energy possessed by the combustion gas to rotational energy.

On the other hand, in the invention disclosed in Patent Document 1, in the side end portion of the segment body, cooling holes are disposed from the upstream to the downstream in the flow direction of the combustion gas along the side end portion, and by blowing out cooling air after impingement cooling from the cooling holes, convection cooling of the side end portion is performed. The cooling holes are normally arrayed at the same hole diameter and hole pitch. Along with the decrease in the pressure of the combustion gas, the differential pressure of the pressure of the combustion gas and the air pressure in the cooling space increases further toward the downstream. Accordingly, of the cooling air that is blown out from the cooling holes, a greater quantity of air than is required for cooling flows at the downstream, which leads to the problem of a loss of the cooling air amount.

The present invention was achieved in view of the above-mentioned problem, and has as its object to provide a cooling system of ring segment that achieves a reduction in the amount of cooling air that cools the side end portions of the ring segment, optimization of the cooling air amount of the ring segment as a whole and an improvement in the thermal efficiency of the gas turbine, and a gas turbine.

Means for Solving the Problem

The present invention adopts the following means in order to solve the aforementioned problems.

The cooling system of ring segment of the present invention is a cooling system of ring segment that is formed from a plurality of segment bodies that is arranged in the circumferential direction to form a ring shape, and that cools a ring segment of a gas turbine that is arranged in a casing so that the inner peripheral surface of each segment body is kept at a fixed distance from the tip of a turbine blade, in which the segment body is provided with a collision plate that has a small hole that causes cooling air that is supplied from outside of the casing to be blown out and performs impingement cooling of the main body of the segment body; a cooling space that is enclosed by the collision plate and the main body of the segment body; a first cavity that, of the side end portions of the segment body along the axial direction of the rotating shaft, is arranged in the axial direction of the rotating shaft along at least one side end portion, and receives from the cooling space the cooling air after the impingement cooling; and a first cooling passage, of which one end communicates with the first cavity, and the other end blows out the cooling air from an opening that is arranged in the side end portions into combustion gas; and the openings of the first cooling passages being arranged so that the arrangement pitch of the openings becomes smaller or the opening area of the openings becomes larger on the upstream side in the flow direction of the combustion gas than the openings on the downstream, and are arranged so that the arrangement pitch of the openings becomes larger or the opening area of the openings becomes smaller on the downstream in the flow direction of the combustion gas than the openings on the upstream.

According to the present invention, since the openings of the first cooling passages that are arranged at the side end portions of the segment body are arranged so that the arrangement pitch becomes smaller or the opening area becomes larger on the upstream in the flow direction of the combustion gas, and arranged so that the arrangement pitch becomes larger or the opening area becomes smaller on the downstream in the flow direction of the combustion gas, the amount of cooling air that is blown out from the downstream of the side end portion of the segment body into the combustion gas is reduced, and the amount of cooling air that cools the side end portion is optimized. Also, the thermal efficiency of the gas turbine is improved by a reduction in the amount of cooling air.

The openings of the first cooling passages in the present invention may be arranged in at least the side end portion on the front side in the rotation direction of the rotating shaft.

According to the present invention, since the heat load is higher at the side end portion on the front side in the rotation direction than the one on the rear side, it is possible to prevent thermal damage of the side end portion.

The openings in the first cooling passages may be divided into two regions from the upstream to the downstream in the flow direction of the combustion gas, and arranged so that the arrangement pitch of the openings becomes smaller or the opening area of the openings becomes larger in a first region on the upstream than a second region on the downstream, and arranged so that the arrangement pitch of the openings becomes larger or the opening area of the openings becomes smaller in the second region on the downstream than the first region.

According to the present invention, since the drop in pressure of the combustion gas is significant in the second region compared to the first region, the amount of cooling air that is blown out from the openings of the second region into the combustion gas is restricted, and the amount of cooling air of the second region is reduced, the amount of cooling air of the entire segment body is reduced.

Among the openings of the first cooling passages in the present invention, the position on the upstream at which the second region starts may be a start point.

The openings of the first cooling passages in the present invention may be divided into three regions from the upstream to the downstream in the flow direction of the combustion gas, and arranged so that the arrangement pitch of the openings becomes smaller or the opening area of the openings becomes larger in a first region furthest on the upstream than the other regions, arranged so that the arrangement pitch of the openings becomes larger or the opening area of the openings becomes smaller in a third region furthest on the downstream than the other regions, and arranged so that the arrangement pitch of the openings gradually becomes larger or the opening area of the openings gradually becomes smaller from the upstream to the downstream in a second region that is sandwiched between the first region and the third region.

According to the present invention, since the openings of the first cooling passages are divided into three regions from the upstream to the downstream, and selected so that the arrangement pitch of the openings in each region becomes larger or the opening area of the openings becomes smaller from the upstream to the downstream, and in particular in the second region in which the pressure reduction is acute, the arrangement pitch of the openings gradually becomes larger or the opening area of the openings gradually becomes smaller from the upstream to the downstream, optimization of the amount of cooling air of the second region is achieved, and the amount of cooling air of the entire segment body is reduced.

Among the openings of the first cooling passages in the present invention, the position on the upstream at which the second region starts may be a start point and the position on the upstream at which the third region starts is an end point.

The start point may change between a first start point furthest on the downstream in the flow direction of the combustion gas and a second start point furthest on the upstream in the flow direction of the combustion gas.

According to the present invention, since the position at which a rapid drop in the combustion gas pressure starts changes between the first start point and the second start point in accordance with the blade shape, by selecting the start point position therebetween to change the opening pitch or the opening area, a suitable cooling air amount that matches the blade shape can be selected.

The segment body of the present invention may be provided with a second cavity that is arranged at the upstream end portion of the segment body in the flow direction of the combustion gas so as to be perpendicular to the axial direction of the rotating shaft; a second cooling passage that is provided in the axial direction of the rotating shaft and communicates from the cooling space to the second cavity; and a third cooling passage that is provided in the axial direction of the rotating shaft and opens from the second cavity to the combustion gas in the downstream end portion of the segment body.

According to the present invention, the amount of cooling air that cools the segment body main body and the upstream end portion is reduced, and a reduction in the amount of cooling air of the entire segment body is achieved.

The second cooling passage and the third cooling passage of the present invention may be provided with a structure of turning back in the axial direction of the rotating shaft via the second cavity.

According to the present invention, since the cooling passages are connected in series by the cooling passages in the axial direction of the rotating shaft being provided with the turn-back structure, the length of the cooling passage of the main body of the segment body in the flow direction of the combustion gas becomes the longest, and a reduction in the amount of cooling air of the main body is achieved.

A gas turbine of the present invention may be provided with the aforementioned cooling system of ring segment.

According to the present invention, since optimization of the amount of cooling air of the ring segment is achieved, the thermal efficiency of the gas turbine improves.

Effect of the Invention

According to the aforementioned present invention, the amount of cooling air that cools the side end portions of the main body of the ring segment is reduced, optimization of the amount of cooling air of the entire ring segment is achieved, and the thermal efficiency of the entire gas turbine is improved.

BRIEF DESCRIPTION OF THE DRAWINGS

FIG. 5 shows the blade profile, the relationship between pressure distribution of the combustion gas, and the distribution of the heat transfer coefficient of the cooling air side and the positions of the openings of the side end portion.

FIG. 6 shows the arrangement of the openings in the side end portion according to Embodiment 1.

FIG. 7 shows the pressure distribution of the combustion gas of Embodiment 2 and the distribution of the heat transfer coefficient on the cooling air side, and the arrangement of the openings on the side end portion.

DETAILED DESCRIPTION OF THE INVENTION

Embodiments of a cooling system of ring segment and gas turbine according to the present invention shall be described hereinbelow with reference to FIG. 1 to FIG. 10.

[Embodiment 1]

A description of Embodiment 1 shall be given hereinbelow based on FIG. 1 to FIG. 6, FIG. 10 and FIG. 11.

Figure 11:
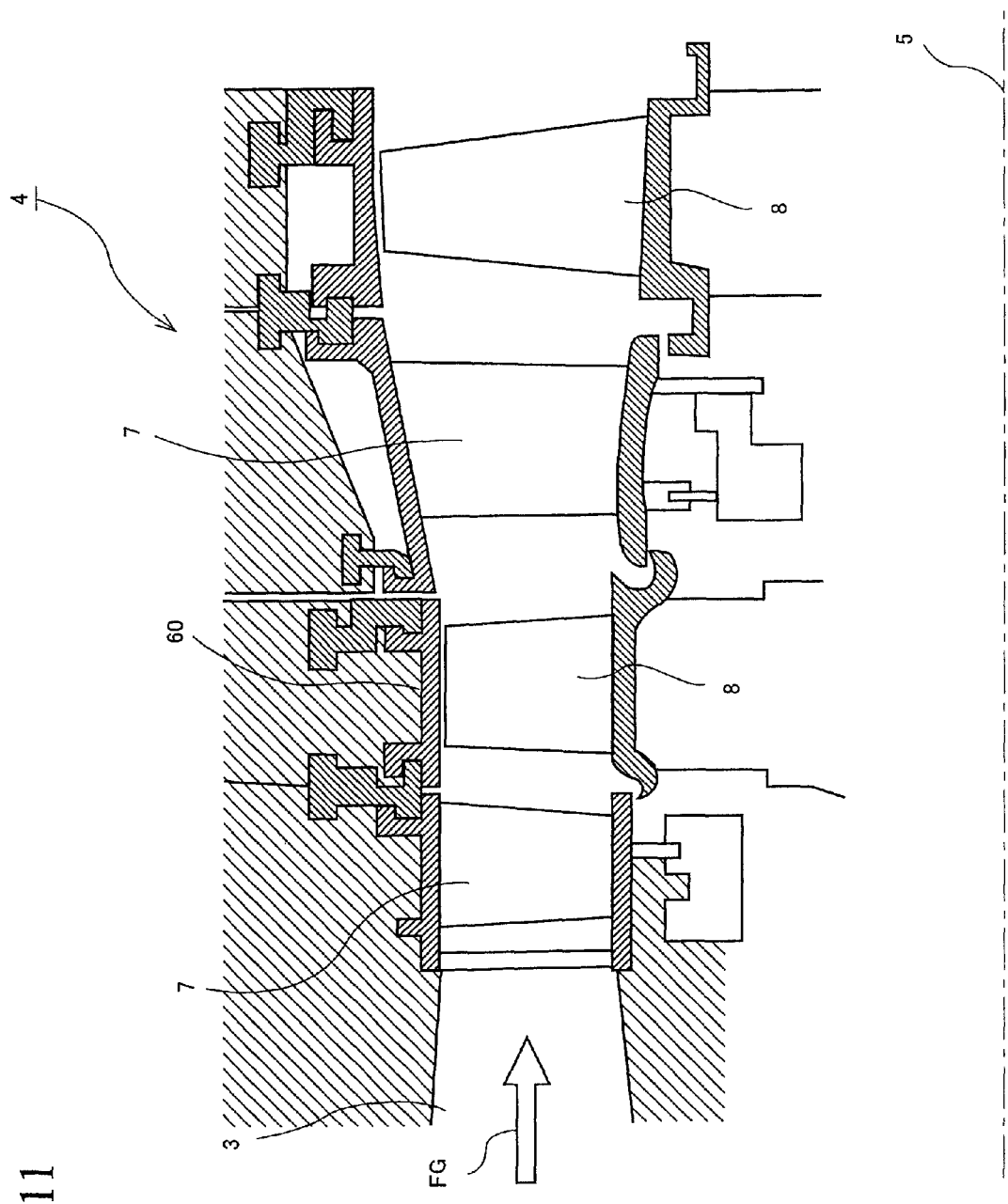
FIG. 11 shows the internal structure of the turbine section.
Figure 12:
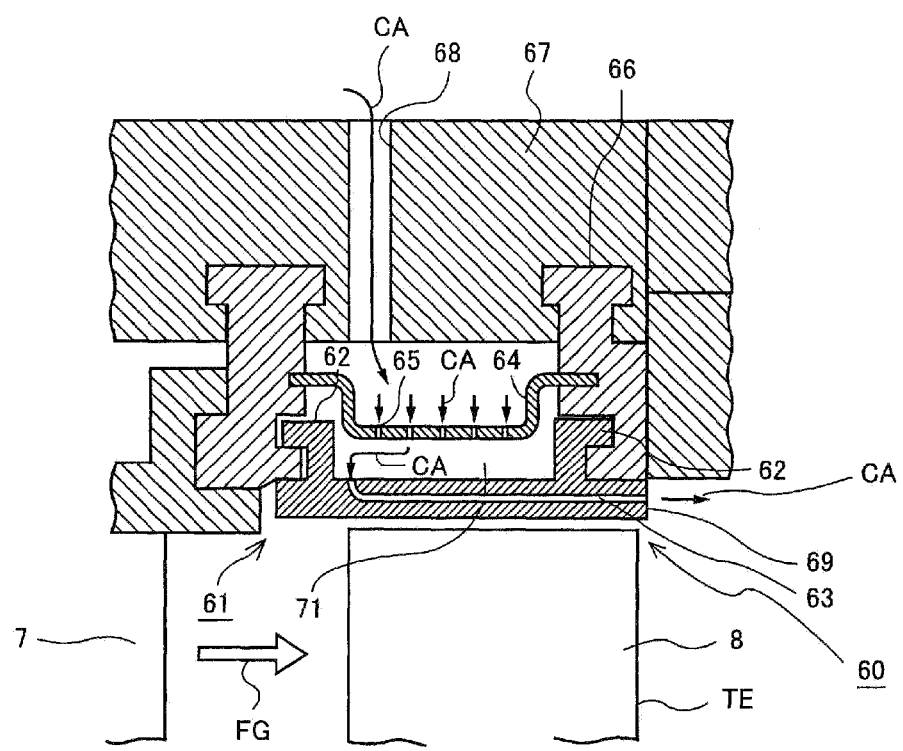
FIG. 12 is an essential portion cross-sectional view of the ring segment shown in a conventional example.
Figure 13:
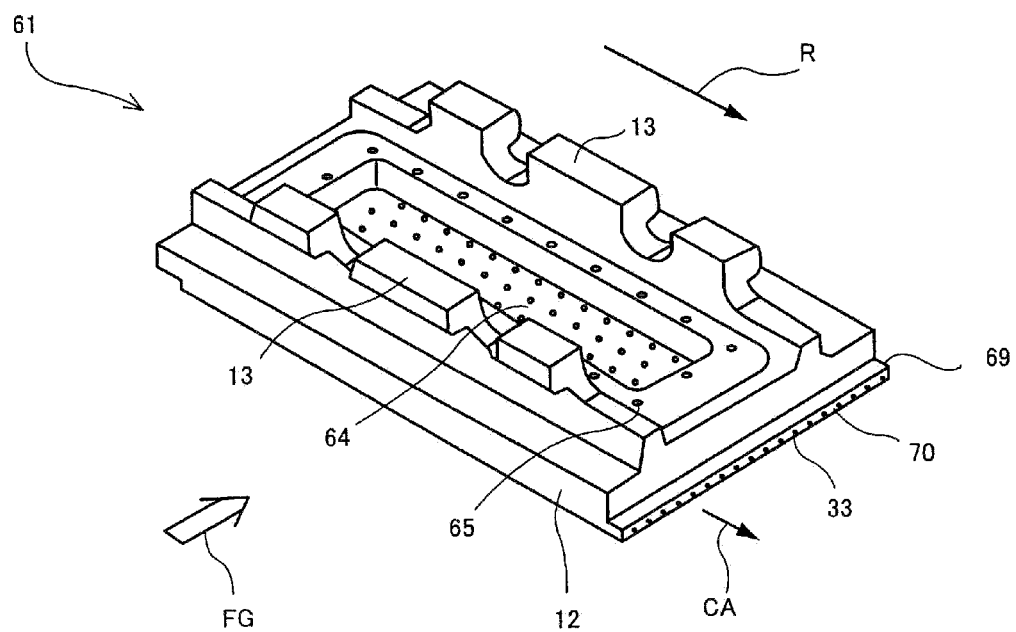
FIG. 13 shows a perspective view of the ring segment shown in the conventional example.

Since the turbine section has the same constitution as the content described in FIG. 11 and FIG. 12 of the prior art, a detailed description thereof shall be omitted. The same names and reference numerals shall be used for common component names and reference numerals.

Figure 1:
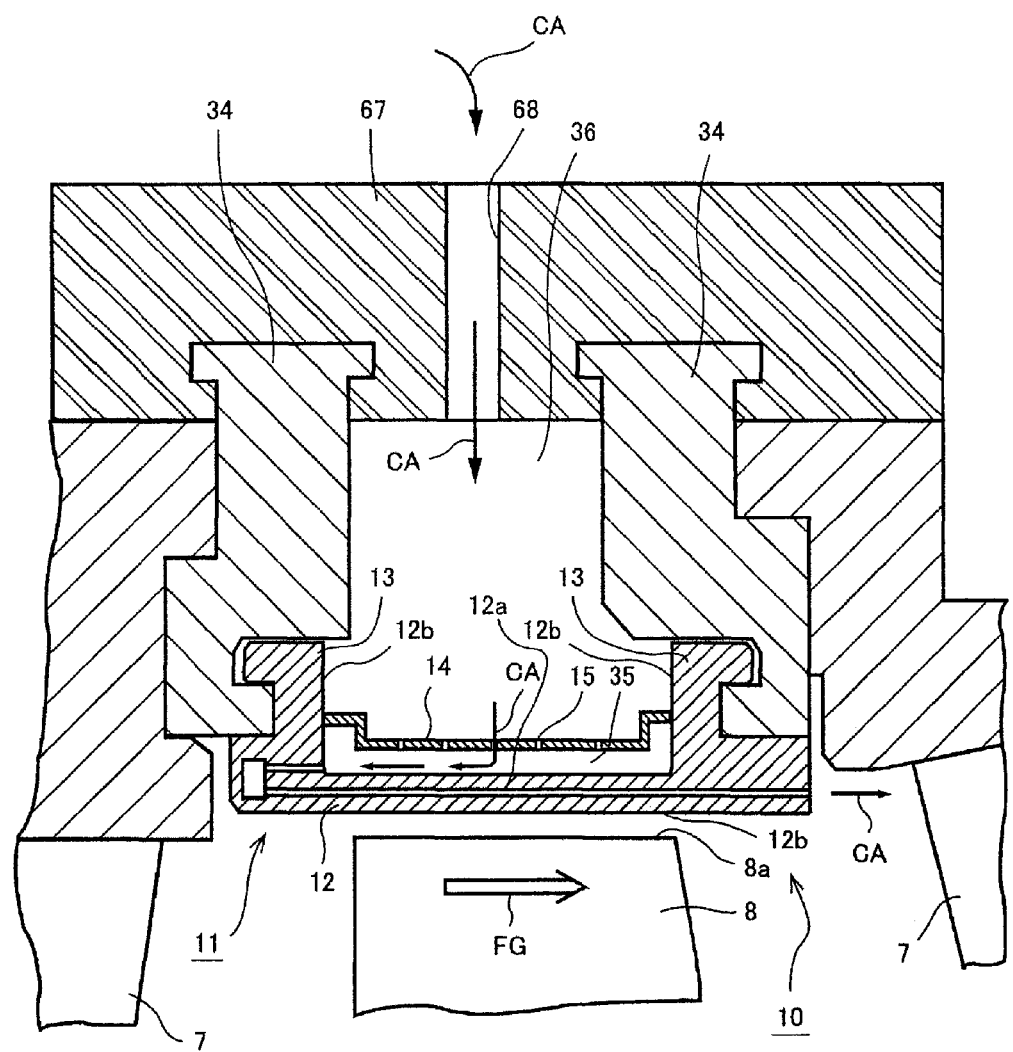
FIG. 1 shows an essential portion cross-sectional view of the ring segment of Embodiment 1.

FIG. 1 shows a cross section of the essential portions of a ring segment of a gas turbine.

A ring segment 10 is a constituent member of the turbine section 4 that is supported by the casing 67, and is formed by a plurality of segment bodies 11 that is arranged in the circumferential direction of a rotating shaft 5 to form a ring shape. The segment bodies 11 are positioned so that a certain tip clearance is secured between the inner peripheral surface 12b of the main body of the segment body 11 and a tip 8a of the turbine blades 8. The segment body 11 is formed from a heat-resistant nickel alloy or the like.

In the segment body 11, the main constituent elements are a main body (bottom plate) 12, hooks 13, and a collision plate 14. The segment body 11 is attached to a thermal insulation ring 34 via the hooks 13 that are provided on the upstream in the flow direction of the combustion gas FG (hereinbelow called the "upstream") and the downstream in the flow direction of the combustion gas (hereinbelow called the "downstream"), and is supported by the casing 67 via the thermal insulation ring 34. The segment body 11 is provided with the main body 12, the collision plate 14, the hooks 13 that are arranged on the upstream said and downstream, and side end portions 18 and 19 (refer to FIG. 4) that are provided along the axial direction of the rotating shaft 5. A cooling space 35 is formed in the segment body 11, and is a space that is sandwiched by the main body 12 of the segment body 11 and the collision plate 14, and is a space that is in contact with an upper surface 12a side of the ring segment main body 12.

The upper portion of the cooling space 35 is partitioned by the collision plate 14, and a large number of the small holes 15 through which the cooling air CA passes are provided in the collision plate 14. Above the collision plate 14, a reception space 36 is disposed in which cooling air in the casing 67 is introduced via a supply hole 68. The cooling air that is supplied to the reception space 36 blows into the cooling space 35 from the small holes 15 in the state of the entirety being equalized to approximately the same pressure, and performs impingement cooling of the upper surface 12a of the main body 12 of the segment body 11.

Figure 2:
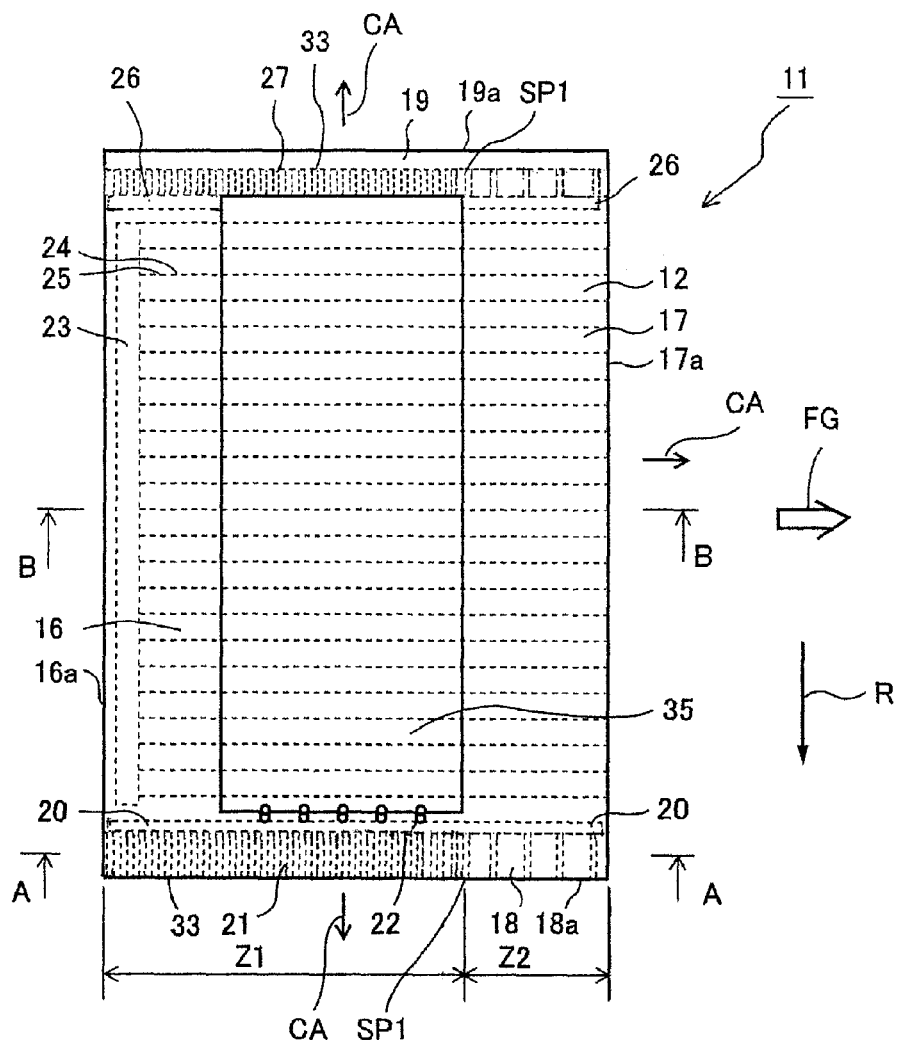
FIG. 2 is a plan cross-sectional view of the segment body shown in Embodiment 1.

FIG. 2 is a plan cross-sectional view of the segment body 11 in the case of viewing in the center direction of the rotating shaft 5 from the casing 67 side. The cooling system of the side end portions 18 and 19 of the segment body 11 shall be described with reference to FIG. 2.

In the side end portion 18 of the front side of the segment body 11 in the rotation direction R of the rotating shaft 5 (hereinbelow referred to as the "front side"), front side end portion cooling passages 21 (first cooling passages) that communicate from the front side end portion cavity 20 (first cavity) to the combustion gas FG are disposed, being connected from the cooling space 35 to the front side end portion cavity 20 via connecting passages 22. The front side end portion cooling passages 21 are disposed in a direction that is approximately perpendicular to the axial direction of the rotating shaft 5, but may also be slanted passages having a slant toward the downstream.

Figure 3:
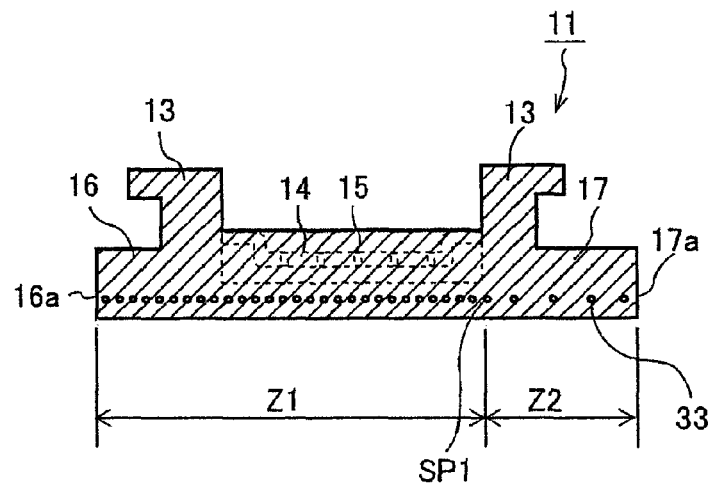
FIG. 3 is a longitudinal cross-sectional view (cross section along line A-A) of the segment body shown in FIG. 2.

Also, the front side end portion cooling passages 21 are preferably provided in the side end portion 18 on the front side. The openings 33 that are provided in a side end portion end face 18a and through which the cooling air is blown out to the combustion gas are provided in a plurality and having a circular shape, with the same hole diameter. Also, the arrangement pitch of the openings 33 is small on the upstream (the upstream end portion 16 side on the upstream) and large on the downstream (the downstream end portion 17 side on the downstream). As shown in FIG. 3, for the openings 33 that are disposed in the side end portion end face 18a, the arrangement pitch of the openings 33 is small in a first region Z1 on the upstream, and the arrangement pitch of the openings 33 is large in a second region Z2 on the downstream. The relationship between the arrangement of the openings 33 and combustion gas pressure, and the significance of the regions (first region Z1 and second region Z2) are described below.

As shown in FIG. 2, the side end portion 19 of the rear side of the segment body 11 in the rotation direction R (hereinbelow referred to as the "rear side") may be provided with the same cooling system as the side end portion 18. That is, rear side end portion cooling passages 27 (fourth cooling passages) that have the same constitution as the front side end portion cooling passages 21 are disposed in the side end portion 19 from the upstream to the downstream. One end of each rear side end portion cooling passage 27 communicates with the cooling space, and the other end opens from the opening 33 of the side end portion end face 19a to the combustion gas. Note that the hole diameter and arrangement pitch of the openings 33 provided in the side end portion end face 19a of the rear side end portion cooling passage 27 are the same constitution as the openings 33 of the side end portion 18 on the front side.

Also, as shown in FIG. 2, a rear side end portion cavity 26 (third cavity) that is provided in the side end portion 19 in the axial direction of the rotating shaft 5, is provided on the upstream end portion 16 and the downstream end portion 17 of the side end portion 19, sandwiching the cooling space 35, and one side of the rear side end portion cavity 26 communicates with the cooling space 35, and the other side may be connected to the rear side end portion cooling passage 27 that opens to the combustion gas. In this case, the cooling air is supplied from the cooling space 35 to the rear side end portion cooling passages 27 via the rear side end portion cavity 26, and discharged from the openings 33 to the combustion gas.

Note that depending on the operation condition of the gas turbine, convection cooling of the side end portion 19 on the rear side may be omitted without providing the rear side end portion cooling passages 27 in the side end portion 19 on the rear side of the segment body 11 described above. In this case, by performing film cooling of the outer surface of the side end portion 19 on the rear side with cooling air that is blown out from the openings 33 that are provided in the side end portion 18 of the adjacent segment body 11 (the cooling holes of the front side end portion cooling passages 21 that have the same function as the openings 33 of the side end portion 18), it is possible to prevent damage to the side end portion 19.

Next, the cooling system of the main body 12 of the segment body 11 shall be described below.

As shown in FIG. 2, in the segment body 11, an upstream end portion cavity 23 (second cavity) is disposed at the upstream end portion 16 on the upstream in a direction that is approximately perpendicular to the axial direction of the rotating shaft 5. Also, an upstream end portion cooling passage 24 (second cooling passage) that couples the cooling space 35 and the upstream end portion cavity 23 is provided in the axial direction of the rotating shaft 5, and a main body cooling passage 25 (third cooling passage) that opens from the upstream end portion cavity 23 to a downstream end face 17a on the downstream is disposed so as to penetrate the main body 12 of the segment body 11 in the axial direction of the rotating shall 5. The upstream end portion cavity 23 plays the role of a manifold that mutually communicates with the upstream end portion cooling passage 24 and the main body cooling passage 25.

FIG. 3 shows a cross-sectional view of the side end portion 18 of the front side cut along a plane including the rotating shaft 5 (a cross section along line A-A of FIG. 2). The arrangement of the openings 33 is the same as the arrangement pitch of the openings 33 described in FIG. 2, with the arrangement pitch of the openings 33 in the first region Z1 being smaller than in the region Z2, and the arrangement pitch of the openings 33 in the second region Z2 being greater than in the first region Z1. Note that the number of openings 33 shown in each region is an example, and it is not limited to this number.

Figure 4:
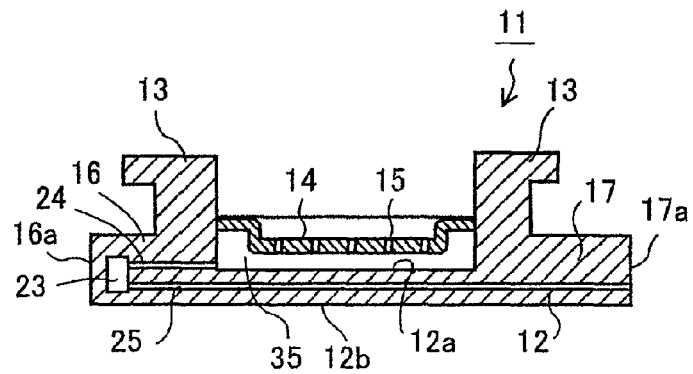
FIG. 4 is a longitudinal cross-sectional view (cross section along line B-B) of the segment body shown in FIG. 2.

FIG. 4 shows a longitudinal cross-sectional view of the cooling passage of the main body 12 of the segment body 11 cut along a plane including the rotating shaft 5 (a cross section along line B-B of FIG. 2). In the upstream end portion 16 of the segment body 11, the upstream end portion cooling passage 24 that connects the cooling space 35 and the upstream end portion cavity 23 is disposed, and the main body cooling passage 25 that connects the upstream end portion cavity 23 and the downstream end face 17a is disposed on the lower side of the upstream end portion cooling passage 24 (the inner side in the radial direction of the segment body).

By the constitution of the upstream end portion cooling passage 24 and the main body cooling passage 25 described above, since the upstream end portion cooling passage 24 has a turn-back structure of turning back at the upstream end portion cavity 23 to connect to the main body cooling passage 25, a cooling passage with a passage length that is long with respect to the axial direction of the rotating shaft 5 is formed. That is, the upstream end portion cooling passage 24 is arranged in the segment body 11 close to the upper surface side 12a of the upstream end portion 16 of the segment body 11. Meanwhile, the main body cooling passage 25 is arranged on the side closer to the lower surface 12b of the main body 12 of the segment body 11 than the upstream end portion cooling passage 24, and by being turned back at the upstream end portion cavity 23, is extended until the downstream end face, and blows out to the combustion gas at the opening on the downstream end face. As a result, the cooling passage of the present embodiment can be formed with a longer passage length in the axial direction of the rotating shaft 5 compared to the conventional examples, and so the cooling performance of the segment body 11 is improved.

Figure 5A:
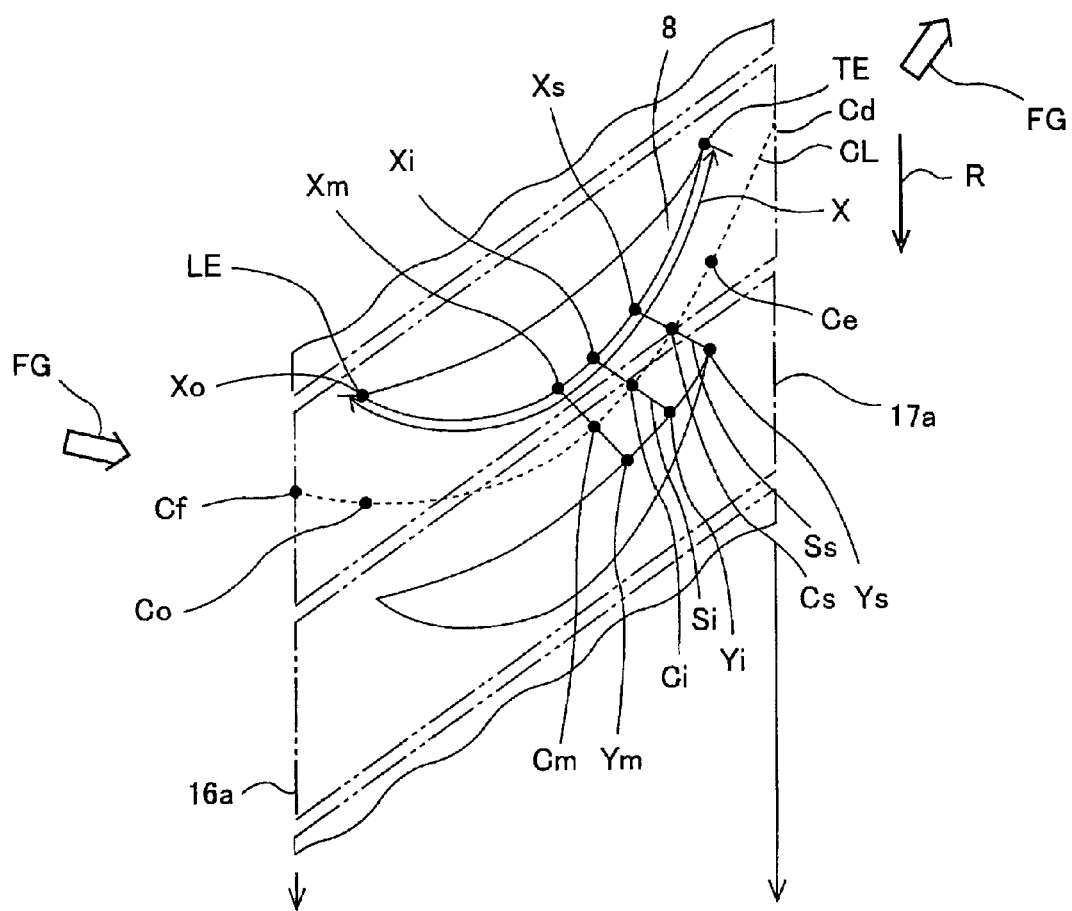
FIG. 5A shows the blade profile of the turbine blades.

Next, the relationship between the blade profile of the turbine blades 8 and the pressure distribution of the combustion gas in the present embodiment shall be described with reference to FIG. 5A to FIG. 5C. FIG. 5A shows a plan view of a portion of the blade example of the turbine blades 8. FIG.

5B shows the pressure distribution of the combustion gas flow in the vicinity of the tip of the turbine blades 8. FIG. 5C shows a side view of the segment body 11 viewed from the front side in the rotation direction of the rotating shaft 5, in a direction perpendicular to the axial direction of the rotating shaft of the turbine blades 8.

Normally, since the pressure of the combustion gas becomes the work on the turbine blades 8, the pressure gradually decreases along the flow direction of the combustion gas, from the leading edge LE of the turbine blades 8 to the trailing edge TE. That is, as the flow passage cross-sectional area between the blades gradually becomes smaller from the leading edge side to the trailing edge side, the combustion gas that has flowed into the combustion gas flow passage between the turbine blades 8 is accelerated. Also, the flow direction of the combustion gas is altered by the turbine blades 8, and by rotating the turbine blades 8, the pressure of the combustion gas is converted to work, and the pressure (static pressure) and temperature of the combustion gas decrease.

In the blade profile of the turbine blades 8 shown in FIG. 5A, a coordinate axis X is set along the suction side of the blade profile from the leading edge LE to the trailing edge TE, with the leading edge LE serving as the origin $X_0$. At an arbitrary point Xi on the X axis in the coordinate axis X, a normal line is erected toward the pressure side of the blade surface of the adjacent blades, and the intersection point of the pressure side of the blade profile of the adjacent blades with the normal line is denoted as Yi. The normal line Xi-Yi corresponds to the inter-blade length Si.

The inter-blade length Si gradually decreases from the leading edge to the trailing edge, and the inter-blade length Ss that connects the point Xs on the X axis and the point Ys of the trailing edge TE of the adjacent blades becomes the shortest length. The shortest inter-blade length Ss is called the throat length, and the normal line Xs-Ys that forms the inter-blade length Ss is called the throat. The cross-sectional area of the inter-blade passage in the inter-blade length Si becomes the smallest cross-sectional area at the position of the normal line connecting the points Xs-Ys. That is, when the combustion gas passes the throat, the gas velocity of the combustion gas is fastest. Also, with the point on the X axis that shows the maximum blade thickness of the turbine blades 8 denoted as $X_m$, by erecting a normal line from the point $X_m$ to the pressure side of the blade surface of the adjacent turbine blades 8, and denoting the intersection point of the pressure side of the blade profile of the adjacent blades with the normal line as $Y_m$, the normal line $X_m$-$Y_m$ indicates the inter-blade length $S_m$ that corresponds to the maximum blade thickness of the turbine blades 8.

The pressure (static pressure) at the inner circumference 12b of the segment body main body 12 of the ring segment 11 that receives the combustion gas fluctuates in a regular manner with the rotation of the rotating shaft 5. That is, when the tip of the turbine blades 8 passes the vicinity of the side end portion 18 that is provided with the openings 33 of the segment body 11 in the case of the pressure side of the blade surface passing, the pressure increases, and in the case of the suction side of the blade surface passing, the pressure decreases. Accordingly, the average value of the pressure in the case of the pressure side of the blade surface passing and the pressure in the case of the suction side of the blade surface passing is taken, and this value can be approximated as the pressure in the vicinity of the side end portion 18. That is, since the pressure along the center line CL of the inter-blade passage can be considered as the aforementioned average value of the pressure of the pressure side of the blade surface and the pressure of the suction side of the blade surface, it is possible to approximate the pressure in the vicinity of the side end portion 18 of the segment body main body 12 as the pressure along the center line of the inter-blade passage. Based on this concept, the pressure distribution in the vicinity of the openings 33 of the side end portion end face 18a of the segment body 11 is shown in FIG. 5B. Here, the center line of the inter-blade passage refers to a line that connects the midpoints Ci of the inter-blade length Si.

With the position at which the center line CL of the inter-blade passage and the normal line Xi-Yi intersect denoted as the point Ci, if the position on the center line corresponding to the origin $X_0$ of the X axis on the center line is denoted by the leading edge point $C_0$, the position at which the normal line Xm-Ym and the center line intersect at the point Xm on the X axis that indicates the maximum blade thickness is denoted by the maximum blade thickness point Cm, the position at which the center line and the throat intersect is denoted by the throat point Cs, and the position on the X axis corresponding to the trailing edge is denoted by the trailing edge point Ce, it is possible to express the center line CL by a curve that joins the points $C_0$, Cm, Cs, Ce. Note that if the center line is further extended to the upstream and the downstream, and the point at which the upstream end face 16a and the center line intersect is denoted by the upstream point Cf, and the point at which the downstream end face 17a and the center line intersect is denoted by the downstream point Cd, the center line Cf-$C_0$ and the center line Cd-Ce can be approximated to tangents at the leading edge point $C_0$ and the trailing edge point Ce of the center line $C_0$-Ce, respectively. That is, the center line between the upstream point Cf and the downstream point Cd is formed by the center line that connects the midpoints of the inter-blade length and the line Cf-$C_0$ and the line Cd-Ce having a straight line shape.

Figure 5B:
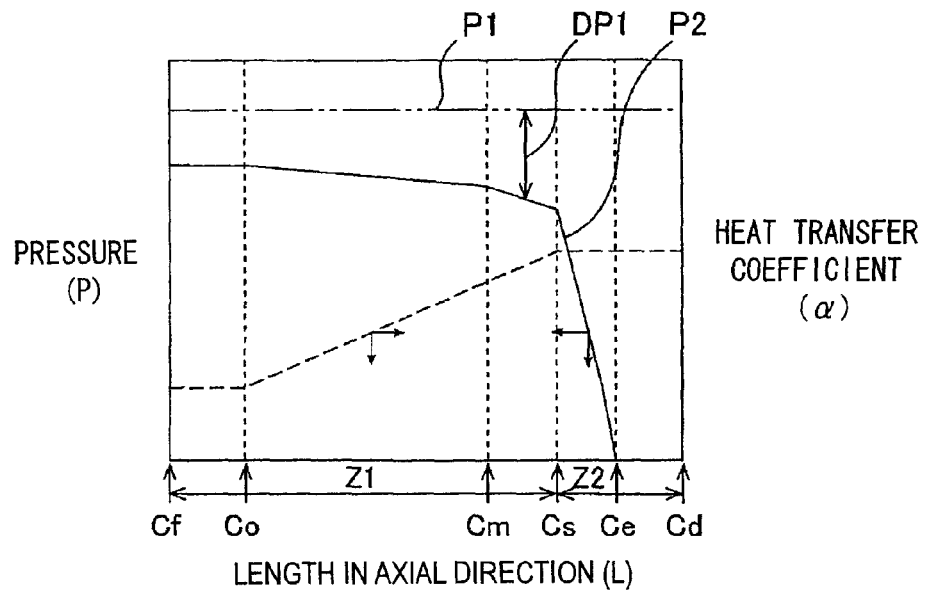
FIG. 5B shows the relationship between the pressure distribution of the combustion gas and the distribution of the heat transfer coefficient on the cooling air side, and the length L in the axial direction.

Next, the pressure distribution of the combustion gas shall be described using FIG. 5B, and in conjunction the distribution of the heat transfer coefficient on the cooling air side shall be described. In FIG. 5B, the horizontal axis shows the length L of the segment body 11 in the axial direction of the rotating shaft 5. Also, in the horizontal axis, the length L is shown from the upstream point Cf of the combustion gas (upstream end face 16a) to the downstream point Cd (downstream end face 17a). The positional relationship of the points Cf, $C_0$, Cm, Cs, Ce, Cd in the axial direction of the rotating shaft 5 corresponds to the positions shown in FIG. 5A and FIG. 5C. The vertical axis shows the pressure P (static pressure) of the cooling air CA in the segment body 11 and the combustion gas that flows through the inner circumference of the segment body 11. The cooling air pressure P1 of the cooling space 35 is shown by the long dashed double-short dashed line, and the combustion gas pressure P2 along the center line of combustion gas flow is shown by the solid line. Moreover, the differential pressure of the cooling air pressure P1 of the cooling space 35 and the combustion gas pressure P2 in the vicinity of the opening that is provided at the side end portion 18 of the segment body 11 is indicated by DP1. The pressure P1 of the cooling air in the cooling space 35 is approximately a fixed pressure irrespective of flow passage length. In addition, the section from the upstream point Cf (upstream end face 16a) to the throat point Cs is shown by the first region Z1, and the section from the throat point Cs to the downstream point Cd (downstream end face 17a) is shown by the second region Z2.

In FIG. 5B, the combustion gas pressure P2 does not fall from the upstream point Cf to the leading edge point $C_0$ in the first region Z1. In the section from the leading edge point $C_0$ where the combustion gas flows into the inter-blade passage to the maximum blade thickness point Cm, since the passage sectional area gradually narrows toward the downstream, the combustion gas flow velocity therein slowly increases, and the combustion gas pressure P2 falls gradually. Furthermore, from the maximum blade-thickness point Cm to the throat point Cs, the inter-blade passage sectional area becomes still narrower, and the decrease in the combustion gas pressure P1 becomes large.

On the other hand, the combustion gas pressure P2 in the second region Z2 falls rapidly on the downstream from throat point Cs, and the differential pressure DP1 increases rapidly. Since the second region Z2 is immediately on the downstream with respect to the throat position, the change of the differential pressure DP1 is large compared with the first region Z1. Since the differential pressure DP1 changes rapidly around the throat point Cs, the throat point Cs expresses the inflection point of the pressure.

Next, the distribution of the heat transfer coefficient of the cooling air that flows through the inside of the cooling passage of the segment body 11 shall be described.

In FIG. 5B, the heat transfer coefficient α on the cooling air side is shown by the dotted line. The vertical axis shows the heat transfer coefficient α, and the horizontal axis shows the length L in the axial direction of the rotating shaft 5. Since the differential pressure DP1 of the cooling air pressure and the combustion gas pressure hardly changes in the section from the upstream point Cf to the leading edge point $C_0$ in the first region Z1, the heat transfer coefficient α on the cooling air side becomes fixed. In the section from the leading edge point $C_0$ where the combustion gas flows into the inter-blade passage to the throat point Cs, the differential pressure DP1 increases, and so the heat transfer coefficient α on the cooling air side gradually increases toward the downstream, becoming a maximum in the vicinity of the throat point Cs. On the downstream from the throat point Cs, the heat transfer coefficient α on the cooling air side mostly is constant at a maximum value.

Figure 5C:
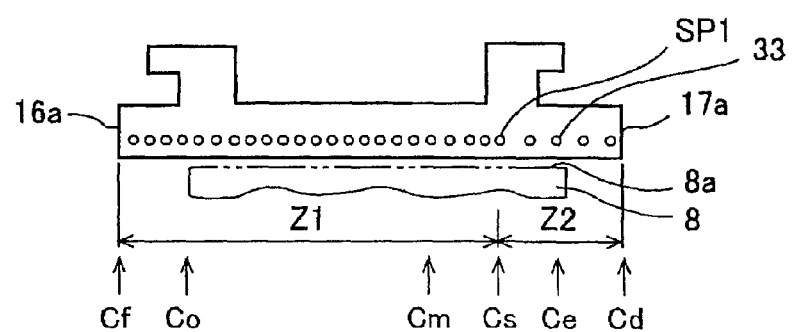
FIG. 5C shows the arrangement of the openings in the side end portion of the segment body.

FIG. 5C shows arrangement of the openings 33 on the side end portion 18 on the front side of the segment body 11 corresponding to FIG. 5A and FIG. 5B. If the position of the opening 33 that is disposed on the side end portion 18 corresponding to the throat point Cs on the center line (the opening matching or closest to the throat point when viewed from the direction perpendicular to the rotating shaft 5) is made the start point SP (first start point SP1), the arrangement pitch of the openings 33 on the downstream is larger than the arrangement pitch of the openings 33 on the upstream, with the start point SP serving as a boundary. That is, the start point SP means the inflection point at which the combustion gas pressure rapidly changes around the start point SP, the heat transfer coefficient on the cooling air side becomes a maximum value, and the pitch of the openings 33 rapidly changes. Note that the shape of the openings at the side end portion 18 was described as being circular, but it may be elliptical, or rectangular, or an elongated hole shape with a slit shape. The opening area of each opening 33 is the same for all.

According to the present embodiment, since the cooling are amount that is blown out from the openings 33 of the downstream is restrained by making the arrangement pitch of the openings 33 on the downstream of the segment body 11 greater than the arrangement pitch of the openings 33 on the upstream, it is possible to reduce the entire amount of cooling air of the side end portion 18.

Moreover, as shown in FIG. 2 and FIG. 4, in the present invention, since the cooling passage that consists of a combination of the upstream end portion cavity 23, the upstream end portion cooling passage 24, and the main body cooling passage 25 has a turn-back structure, and each passage is provided with a cooling system that is connected in series, the differential pressure of the air pressure in the cooling space and the combustion gas pressure that is discharged from the downstream end face becomes the largest. Since it is possible to utilize the maximum differential pressure, it is most efficient on the cooling capability of the main body 12 of the segment body 11. That is, as shown in FIG. 5B, the pressure of the combustion gas flowing along the blade surface becomes lowest in the vicinity of the downstream end face. Accordingly, the cooling air of the cooling space 35 flows through the upstream end portion cooling passage 24 to perform convection cooling of the upper portion of the upstream end portion 16, and is turned back at the upstream end portion cavity 23, and performs convection cooling of the main body 12 of the segment body 11 at the main body cooling passage 25, and is blown out to the combustion gas from the downstream end face. For this reason, since the cooling air is put to repeated use by utilizing the maximum differential pressure of the cooling air pressure and the combustion gas pressure to a maximum extent, it is possible to reduce the cooling air amount of the main body 12 of the segment body 11 than before.

Figure 6A:
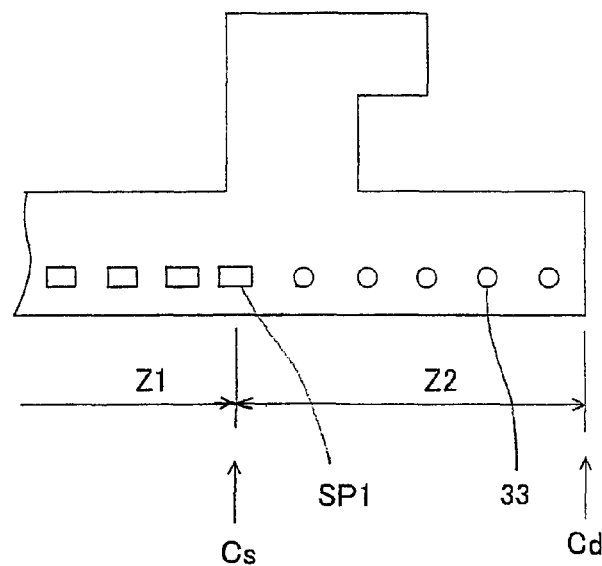
FIG. 6A shows Modification 1.
Figure 6B:
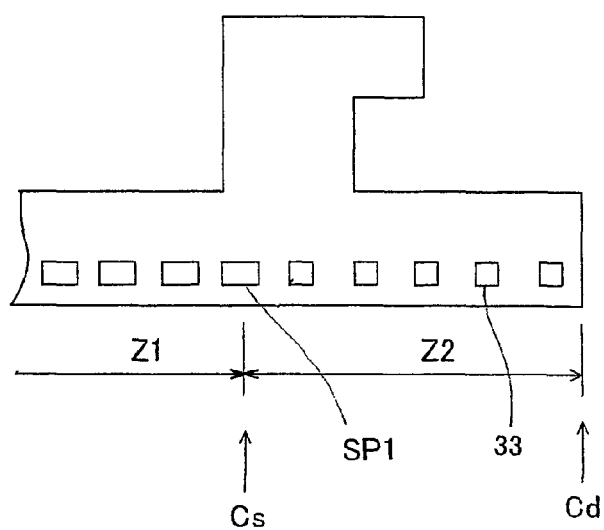
FIG. 6B shows Modification 2.

Modifications of the arrangement of the openings of the side end portion 18 in the Embodiment 1 shown in FIG. 5C are indicated as Modification 1 in FIG. 6A and as Modification 2 in FIG. 6B. The openings 33 shown in Modification 1 consist of rectangular openings 33 on the upstream of the start point SP (first start point SP1), and circular openings 33 on the downstream of the start point SP having a smaller cross-sectional area than the rectangular openings 33 on the upstream. In Modification 2, the openings 33 on the downstream of the start point SP (first start point SP1) are rectangular openings that have a smaller cross-sectional area than the openings 33 on the upstream. The arrangement pitches of the openings 33 shown in Modification 1 and Modification 2 are the same, and both are examples of changing the opening area in the vicinity of the start point SP (first start point SP1). In the present modifications, since a reduction in the amount of cooling air was achieved by making the opening area of the openings 33 smaller along with a rapid pressure reduction of the combustion gas, the same effect as Embodiment 1 was obtained.

[Embodiment 2]

Figure 7A:
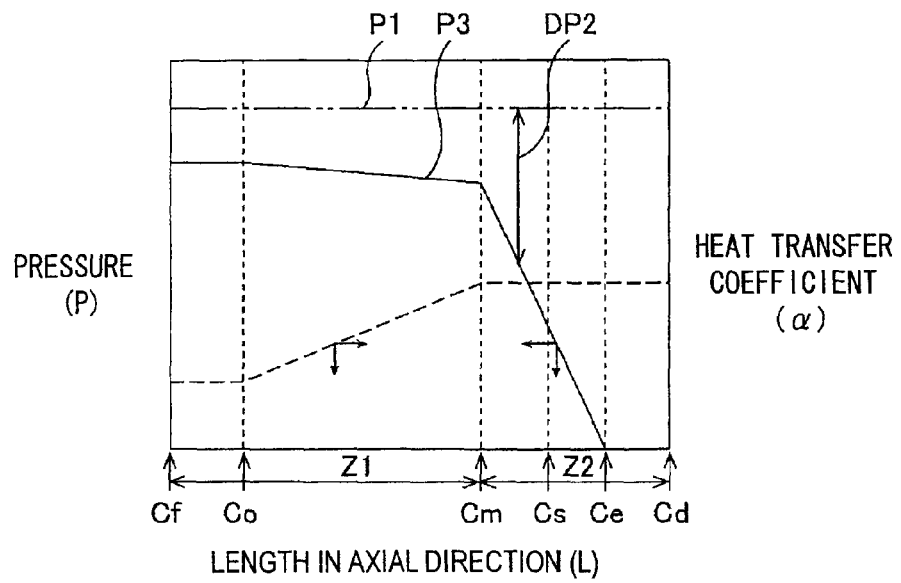
FIG. 7A shows the relationship between the pressure distribution of the combustion gas and the distribution of the heat transfer coefficient on the cooling air side, and the length L in the axial direction.
Figure 7B:
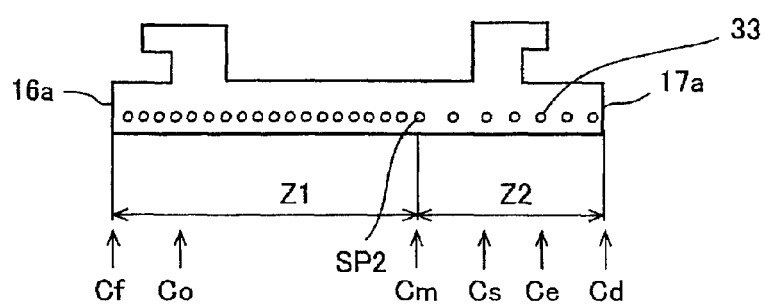
FIG. 7B shows the arrangement of openings in the side end portion.

The Embodiment 2 shall be described with reference to FIG. 7A and FIG. 7B. FIG. 7A shows the relationship between the pressure distribution of the combustion gas of the present embodiment and the length L of the segment body in the axial direction of the rotating shaft 5, and FIG. 7B shows the arrangement of the openings 33 on the side end portion 18 of the segment body 11.

Due to the shape of the turbine blades 8, the pressure of the combustion gas that flows through the inter-blade passage may rapidly decrease more on the upstream side than in Embodiment 1. That is, in Embodiment 1, the position at which the combustion gas pressure rapidly decreases is at the throat point Cs, but in the present embodiment, assuming the case of the position at which the combustion gas rapidly decreases going back furthest upstream, the case is shown of it at the maximum blade thickness point Cm.

FIG. 7A shows the relationship between the change in the combustion gas pressure P3 and heat transfer coefficient α on the cooling air side, and the length L of the segment body 11 in the axial direction of the rotating shaft 5, and shows the differential pressure of combustion gas pressure P3 and the cooling air pressure P1 of the cooling space 35 by DP2. Also, the upstream is indicated by the first region Z1 and the downstream is indicated by the second region Z2, with the maximum blade thickness point Cm serving as the boundary. In the same manner as Embodiment 1, the cooling air pressure P1 is shown by the long dashed double-short dashed line, the combustion gas pressure P3 is shown by the solid line, and the heat transfer coefficient α on the cooling air side is shown by a dotted line. FIG. 7B shows the arrangement of the openings 33 of the side end portion 18 in the present embodiment corresponding to FIG. 7A. Also, the position of the openings on the side end portion 18 of the segment body corresponding to the maximum blade thickness point Cm is shown as the start point SP (second start point SP2). Each of the openings 33 of the side end portion 18 of the present embodiment has the same opening area, but the arrangement pitch of the openings 33 that are disposed on the downstream of the start point SP (second start point SP2) is greater than the arrangement pitch of the openings 33 that are disposed on the upstream of the start point SP. Note that the shape of the openings shown in FIG. 7B is shown to be circular, but it may be rectangular, elliptical or an elongated hole shape with a slit shape.

According to the present embodiment, even in the case of the combustion gas pressure rapidly falling from the maximum blade thickness point Cm, by changing the arrangement pitch of the openings 33 from the start point SP, it is possible to narrow down the cooling air amount that is discharged from the openings 33 to the combustion gas, with respect to the rapid increase of the differential pressure DP2 of the combustion gas pressure P3 in the second region Z2 and a reduction of the cooling air amount of the side end portion 18 is achieved. Also, in the present embodiment, the heat transfer coefficient on the cooling air side becomes a maximum at the maximum blade thickness point Cm, and the heat transfer coefficient becomes fixed from that point at the downstream. That is, in the total range of the second region Z2, since the heat transfer coefficient of the cooling air side becomes the maximum, by making the arrangement pitch of the openings 33 of the side end portion 18 larger than the first region, it is possible to narrow the amount of the cooling air of the second region.

Note that the start point SP1 of the aforementioned Embodiment 1 corresponds to the throat point Cs, and the start point SP2 of the present embodiment corresponds to the maximum blade thickness point Cm. As described above, the start point SP that shows the position at which the combustion gas pressure and the heat transfer coefficient of the cooling air rapidly change fluctuates between the throat point Cs and the maximum blade thickness point Cm.

Figure 7C:
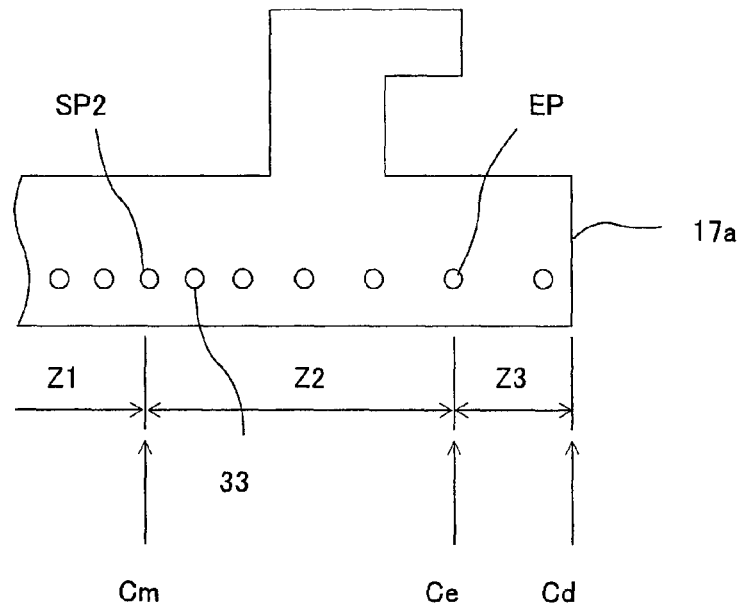
FIG. 7C shows Modification 3 of the arrangement of the openings in the side end portion of Embodiment 2.
Figure 7D:
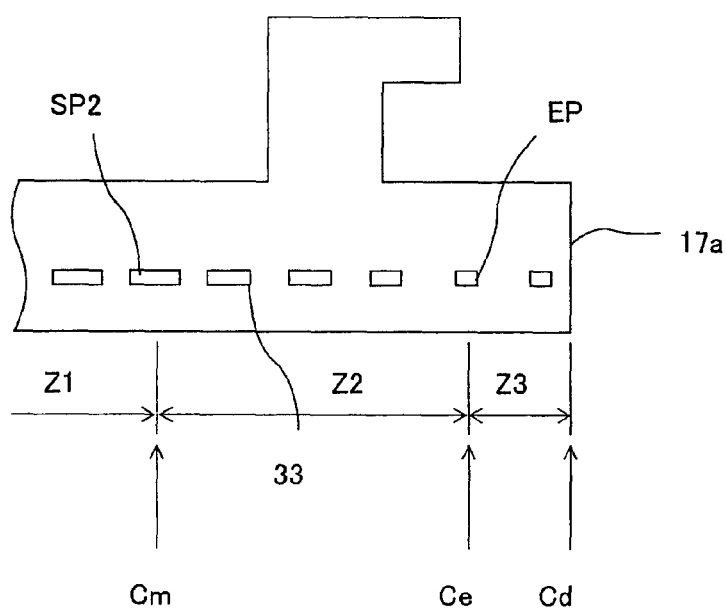
FIG. 7D shows Modification 4 of the arrangement of the openings in the side end portion of Embodiment 2.

An example of further changing the arrangement of the openings 33 with respect to the Embodiment 2 is shown in FIG. 7C (Modification 3) and FIG. 7D (Modification 4), The change in the combustion gas pressure and the heat transfer coefficient of the cooling air does not differ from the combustion gas pressure and the heat transfer coefficient shown in FIG. 7A of Embodiment 2. In the present modification, the openings 33 of the side end portion 18 are divided into three regions. That is, the region furthest on the upstream suns as the first region Z1, the region furthest on the downstream serves as the third region Z3, and the region that is sandwiched therebetween serves as the second region Z2.

As mentioned above, due to the blade shape, there is possibility that the position at which the rapid reduction in the combustion gas pressure P3 occurs (start point) will fluctuate between the maximum blade thickness point Cm and the throat point Cs. Also, the point at which the heat transfer coefficient on the cooling air side becomes a maximum corresponds to the point at which a rapid change in the combustion gas pressure occurs. At the downstream of that position in the flow direction of the combustion gas, the heat transfer coefficient on the cooling air side is constant. It is preferable to select an arrangement of the openings 33 corresponding to such a change in the pressure of the combustion gas and a change in the heat transfer coefficient on the cooling air side.

In Modification 3 shown in FIG. 7C, the second region Z2 in Embodiment 2 is divided into two regions, and the section between the maximum blade thickness point Cm and the throat point Cs is made the second region Z2, and the section between the throat point Cs and the downstream end face 17a (downstream point Cd) is made the third region Z3. The arrangement of the openings 33 in the first region Z1 is the same as Embodiment 1 and Embodiment 2, but in the second region Z2, the arrangement pitch from the upstream to the downstream is set to gradually increase, and in the third region Z3, they are arranged at a uniform pitch which is larger than the arrangement pitch in the other regions. Note that the position of the opening 33 corresponding to the maximum blade thickness point Cm on the upstream where the second region Z2 starts is made the start point SP (second start point SP2), and the position of the opening 33 that corresponds to the trailing edge point Ce on the upstream where the third region Z3 starts is made the end point EP.

FIG. 7D uses a rectangular opening 33 as an example to show a Modification 4 that changes the opening area of the opening 33 corresponding to the change of the combustion gas pressure. The division of the first region Z1, the second region Z2, and the third region Z3 is the same as the Modification 3. The opening area of the openings 33 in the first region Z1 is made a larger area than the other regions, and in the second region Z2, the opening area of the rectangular openings 33 is gradually reduced from the upstream to the downstream, and in the third region Z3, the opening area of the openings 33 is made smaller than the other regions. The shape of the openings 33 may be elliptical, and may be an elongated hole shape with a slit shape. The selection of the start point SP (second start point SP2) and the end point EP is the same as in Embodiment 3.

Note that the drop in the pressure on the upstream of the position of the end point EP is acute, but there is hardly any change in the combustion gas pressure n the downstream of the end point. That is, the end point EP means the inflection point of the combustion gas pressure, similarly to the start point SP. At the upstream of the end point, the opening pitch is gradually increased or the opening area is gradually decreased toward the downstream corresponding to the pressure change around the end point. But on the downstream of the end point the opening pitch or the opening area is selected so as to be constant.

According to the constitution of the present embodiment, the openings 33 are set so that the arrangement pitch thereof gradually increase toward the downstream, or the opening area gradually becomes smaller corresponding to a rapid pressure drop at the second region Z2, compared to Embodiment 2. Therefore, the cooling air amount that is discharged from the openings 33 is reduced together with a drop in the pressure of the combustion gas, and a further cut and optimization of the cooling air amount are achieved compared to Embodiment 2.

[Embodiment 3]

Figure 8:
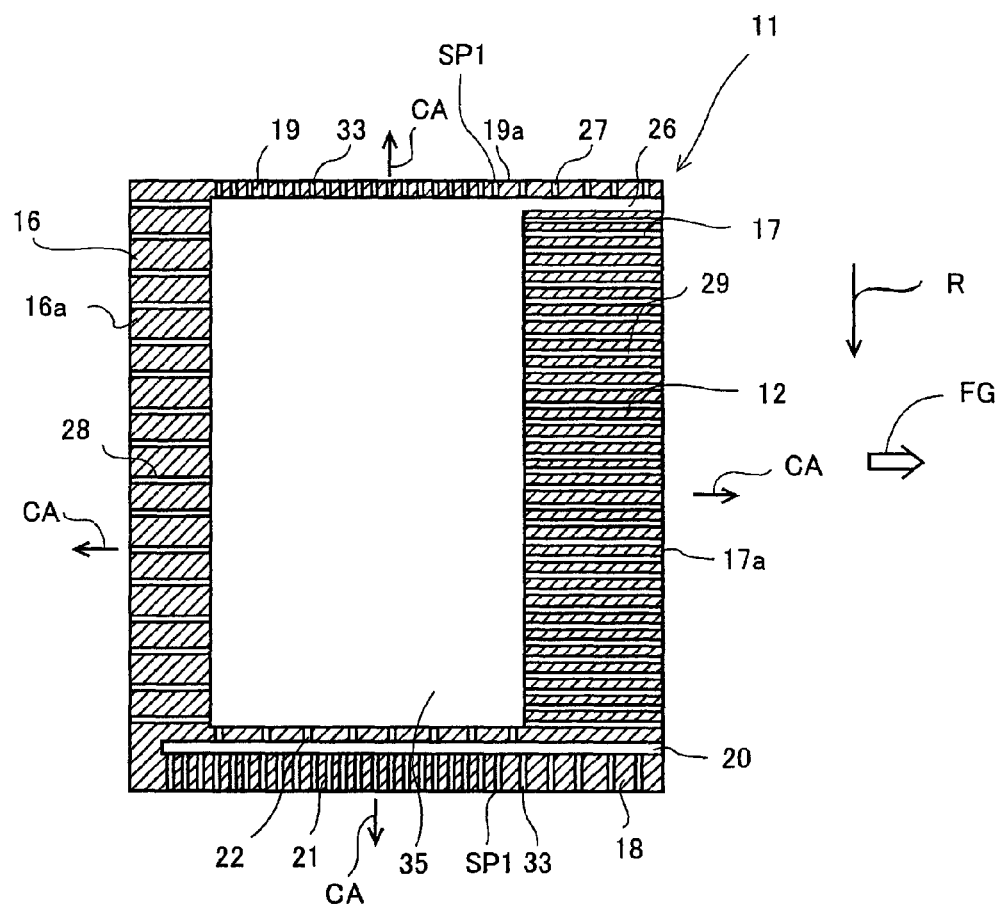
FIG. 8 is a plan cross-sectional view of the segment body of Embodiment 3.

The Embodiment 3 shall be described hereinbelow with reference to FIG. 8.

In the present embodiment, similarly to Embodiment 1, the front side end portion cooling passage 21 and the rear side end portion cooling passage 27 are provided at the side end portions 18 and 19, respectively, and openings 33 that open to the combustion gas are arrayed in the side end portion end faces 18a and 19a via the cooling passages.

Also, in order to cool the segment body main body 12, upstream end portion cooling passages 28 (fifth cooling passage) are provided in the upstream end portion 16, and downstream end portion cooling passages 29 (sixth cooling passage) are provided in the downstream end portion 17. Regarding the arrangement of the openings 33 in the side end portions 18 and 19, the arrangement of the openings shown in Embodiment 1, Embodiment 2, and Modifications 1 to 4 can be applied.

In the side end portion 18 on the front side, the front side end portion cavity 20 is provided in the axial direction of the rotating shaft, and one side of the front side end portion cavity communicates with the cooling space 35 via a connecting passage 22, and the other side is connected to the front side end portion cooling passage 21. The end of the front side end portion cooling passage 21 opens from the opening 33 to the combustion gas. Meanwhile, at the downstream end portion 17 of the side end portion 19 on the rear side, the rear side end portion cavity 26 is provided in the axial direction of the rotating shaft 5, and one side of the rear side end portion cavity 26 communicates with the cooling space 35, and the other side is connected to the rear side end portion cooling passage 27. Furthermore, the end of the rear side end portion cooling passage 27 opens to the combustion gas via the opening 33.

The upstream end portion cooling passage 28 is provided in the upstream end portion 16, with one end thereof communicating with the cooling space 35 and the other end opening to the upstream from the upstream end face 16a in the flow direction of the combustion gas. Furthermore, the downstream end portion cooling passages 29 are provided in the downstream end portion 17, with one end thereof communicating with the cooling space 35, and the other end opening to the downstream from the downstream end face 17a in the flow direction of the combustion gas.

The cooling method of the segment body 11 in the present embodiment shall be described hereinbelow.

In the method of supplying cooling air from the casing 67, similarly to Embodiment 1, impingement cooling of the upper surface of the segment body main body 12 is performed via small holes (not illustrated) in the collision plate 14. Also, when the cooling air after the impingement cooling is blown to the upstream in the flow direction of the combustion gas via the upstream end portion cooling passage 28 that is provided in the upstream end portion 16, convection cooling of the upstream end portion 16 is performed. Also, when the cooling air is blown out into the combustion gas via the downstream end portion cooling passage 29 that is provided in the downstream end portion 17, convection cooling of the downstream end portion 17 is performed. Furthermore, when a portion of the cooling air after the impingement cooling is blown out into the combustion gas from the openings 33 via the front side end portion cooling passages 21 and the rear side end portion cooling passages 27 of the side end portions 18 and 19, respectively, convection cooling of the side end portions 18 and 19 is performed.

Even in the present embodiment, since it is possible to apply the same arrangement of openings in the side end portions 18 and 19 as Embodiment 1, Embodiment 2 and the Modifications 1 through 4, a reduction in the cooling air amount of the side end portion 18 and 19 is achieved. Also, since the upstream end portion 16 and the downstream end portion 17 are convection cooled by the upstream end portion cooling passages 28 and the downstream end portion cooling passages 29, the overall cooling performance of the segment body 11 improves, and the cooling efficiency of the gas turbine is upgraded.

[Embodiment 4]

Figure 9:
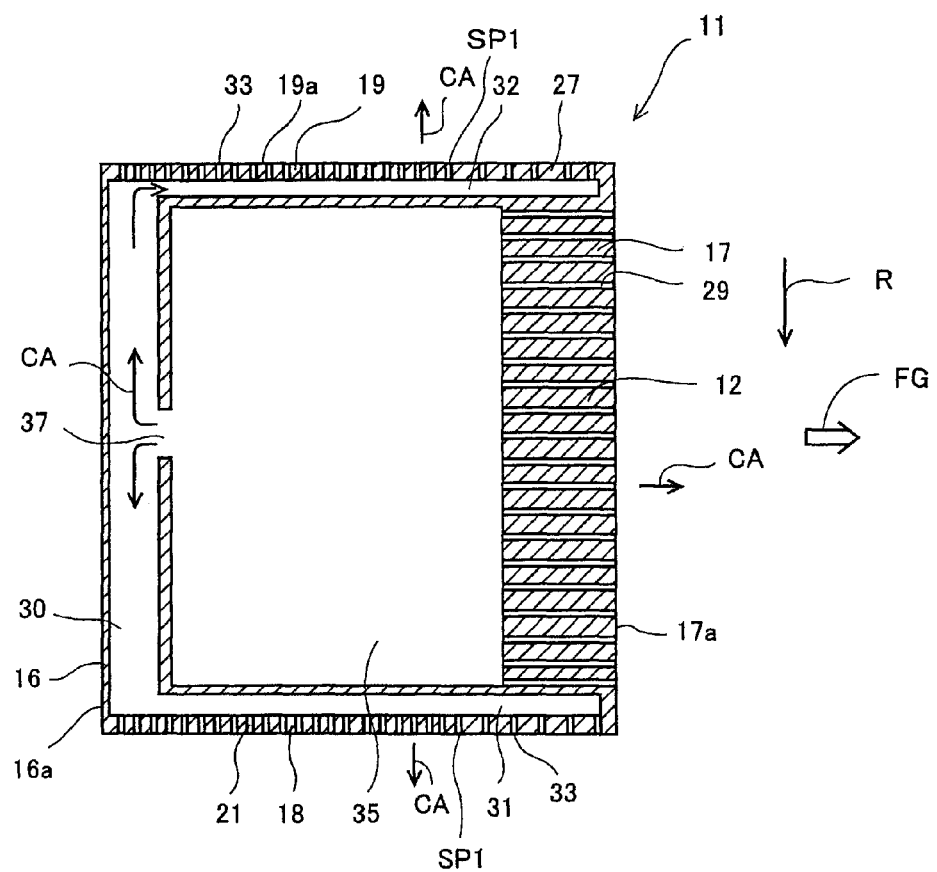
FIG. 9 is a plan cross-sectional view of the segment body of Embodiment 4.
Figure 10:
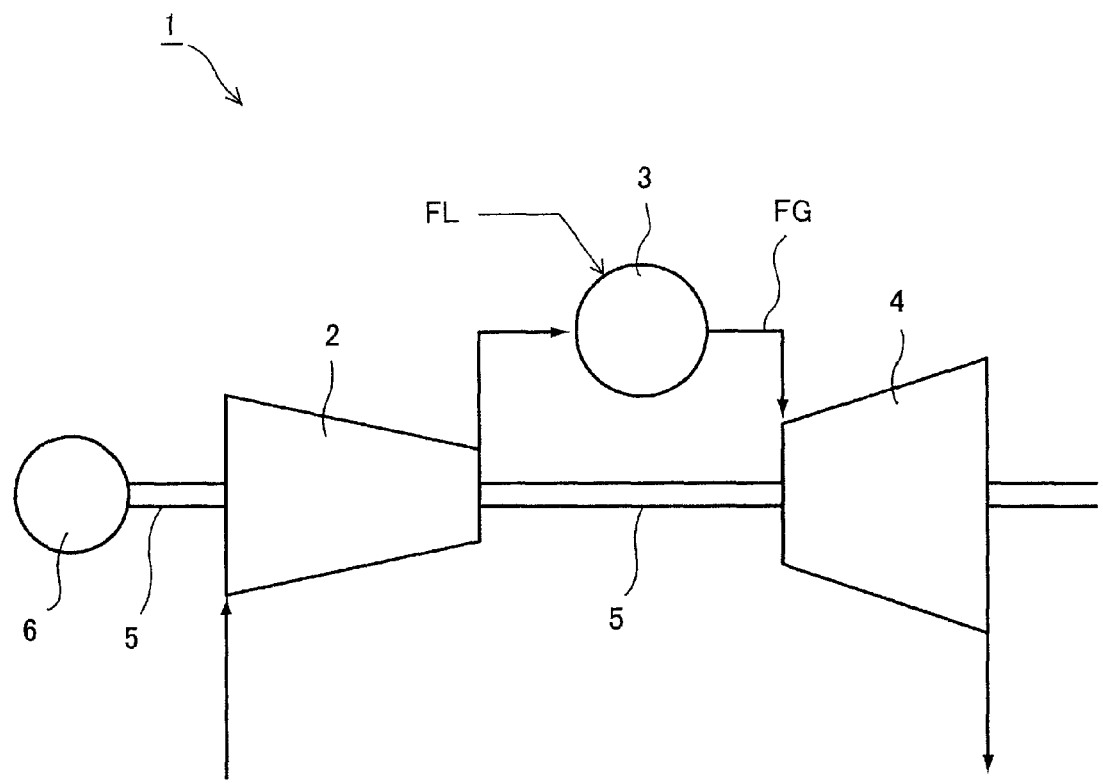
FIG. 10 shows the overall configuration of the gas turbine.

The Embodiment 4 shall be described hereinbelow with reference to FIG. 9. In the present embodiment, similarly to Embodiment 1, the openings 33 that open to the combustion gas are provided in the side end portions 18 and 19 via the front side end portion cooling passages 21 and the rear side end portion cooling passages 27, respectively. As for the arrangement of the cooling holes, it is possible to apply the same arrangement as in Embodiment 1, Embodiment 2 and Modifications 1 through 4.

Also, a front side end portion cavity 31 (fifth cavity) and a rear side end portion cavity 32 (sixth cavity) are disposed in the side end portions 18 and 19, respectively, along the axial direction of the rotating shaft 5, and at the upstream sides thereof communicate with an upstream end portion cavity 30 (fourth cavity) that is disposed in a direction perpendicular to the rotating shaft 5. Moreover, the upstream end portion cavity 30 communicates with the cooling space 35 via an inlet hole 37 in the vicinity of the middle of the cavity. Also, similarly to the downstream end portion cooling passages of Embodiment 2, one end of the downstream end portion cooling passages 29 communicate with the cooling space 35, and the other end thereof open from the downstream end face 17a into the combustion gas.

In the cooling system of the present embodiment, when the cooling air after the impingement cooling is blown from the downstream end Onion cooling passages 29 provided in the downstream end portion 17 into the combustion gas via the openings, the downstream end portion 17 is convectionally cooled. Also, when a portion of the cooling air CA after the impingement cooling flows to the upstream end portion cavity 30 via the inlet hole, and flows through the upstream end portion cavity 30, the upstream end portion 16 is convectionally cooled. Furthermore, when the cooling air of the upstream end portion cavity 30 is supplied to the front side end portion cavity 31 and the rear side end portion cavity 32, and flows through the front side end portion cavity 31 and the rear side end portion cavity 32, convection cooling of the side end portions 18 and 19 is performed. Also, when the cooling air is blown out from the front side end portion cavity 31 and the rear side end portion cavity 32 via the front side end portion cooling passages 21 and the rear side end portion cooling passages 27 from the openings 33 into the combustion gas, further convection cooling of the side end portions 18 and 19 is performed.

Even in the present embodiment, since it is possible to apply the same arrangement of the openings 33 of the side end portions 18 and 19 as Embodiment 1, Embodiment 2 and the Modifications 1 through 4, by changing the opening pitch with respect to a drop of the combustion gas pressure along the flow of the combustion gas, a reduction in the cooling air amount in the side end portions 18 and 19 is achieved. Also, since a cavity is provided in the upstream end portion 16, and the upstream end portion 16 is convection cooled by the cooling air, the cooling performance of the upstream end portion 16 is enhanced, and overall efficient cooling of the segment body 11 and optimization of the cooling air amount are achieved.

The invention is not to be considered as being limited by the foregoing description. Modifications, and improvements and the like can be made without departing from the spirit or scope of the present invention.

INDUSTRIAL APPLICABILITY

With the cooling system of ring segment of the present invention, the amount of cooling air that cools the side end portions of the main body of the ring segment is reduced, optimization of the amount of cooling air of the entire ring segment is achieved, and the thermal efficiency of the entire gas turbine is improved.

DESCRIPTION OF REFERENCE NUMERALS 1 gas turbine
5 rotating shaft
8 turbine blades
10, 60 ring segment
11, 61 segment body
12 main body
14, 64 collision plate
15, 65 small hole
16 upstream end portion
17 downstream end portion
18, 19 side end portion
20, 31 front side end portion cavity (first cavity, fifth cavity)
21, front side end portion cooling passage (first cooling passage)
23, 30 upstream end portion cavity (second cavity, fourth cavity)
24 upstream end portion cooling passage (second cooling passage)
25 main body cooling passage (third cooling passage)
35, 71 cooling space
67 casing
Z1 first region
Z2 second region
Z3 third region
SP start point
SP1 first start point
SP2 second start point
EP end point
CA cooling air
FG combustion gas

What is claimed is:

1. A cooling system of ring segment that is formed from a plurality of segment bodies that is arranged in the circumferential direction to form a ring shape, and that cools a ring segment of a gas turbine that is arranged in a casing so that the inner peripheral surface of each segment body is kept at a fixed distance from the tip of a turbine blades, wherein the segment body comprising:

a collision plate that has a small hole that causes cooling air that is supplied from outside of the casing to be blown out and performs impingement cooling of the main body of the segment body;

a cooling space that is enclosed by the collision plate and the main body of the segment body;

a first cavity that, of the side end portions of the segment body along the axial direction of the rotating shaft, is arranged in the axial direction of the rotating shaft along at least one side end portion, and receives from the cooling space the cooling air after the impingement cooling; and a first cooling passage, of which one end communicates with the first cavity, and the other end blows out the cooling air from an opening that is arranged in the side end portions into combustion gas;

wherein the openings of the first cooling passages being arranged so that the arrangement pitch of the openings becomes smaller or the opening area of the openings becomes larger on the upstream in the flow direction of the combustion gas than the openings on the downstream, and are arranged so that the arrangement pitch of the openings becomes larger or the opening area of the openings becomes smaller on the downstream in the flow direction of the combustion gas than the openings on the upstream.

2. The cooling system of ring segment according to claim 1, wherein the openings of the first cooling passages are arranged in at least the side end portion on the front side in the rotation direction of the rotating shaft.

3. The cooling system of ring segment according to claim 1, wherein the openings of the first cooling passages are divided into two regions from the upstream to the downstream in the flow direction of the combustion gas, and arranged so that the arrangement pitch of the openings becomes smaller or the opening area of the openings becomes larger in a first region on the upstream than a second region on the downstream, and arranged so that the arrangement pitch of the openings becomes larger or the opening area of the openings becomes smaller in the second region on the downstream than the first region.

4. The cooling system of ring segment according to claim 2, wherein the openings of the first cooling passages are divided into two regions from the upstream to the downstream in the flow direction of the combustion gas, and arranged so that the arrangement pitch of the openings becomes smaller or the opening area of the openings becomes larger in a first region on the upstream than a second region on the downstream, and arranged so that the arrangement pitch of the openings becomes larger or the opening area of the openings becomes smaller in the second region on the downstream than the first region.

5. The cooling system of ring segment according to claim 3, wherein the position on the upstream at which the second region starts is a start point.

6. The cooling system of ring segment according to claim 4, wherein the position on the upstream at which the second region starts is a start point.

7. The cooling system of ring segment according to claim 1, wherein the openings of the first cooling passages are divided into three regions from the upstream to the downstream in the flow direction of the combustion gas, and arranged so that the arrangement pitch of the openings becomes smaller or the opening area of the openings becomes larger in a first region furthest on the upstream than the other regions, arranged so that the arrangement pitch of the openings becomes larger or the opening area of the Openings becomes smaller in a third region furthest on the downstream than the other regions, and arranged so that the arrangement pitch of the openings gradually becomes larger or the opening area of the openings gradually becomes smaller from the upstream to the downstream in a second region that is sandwiched between the first region and the third region.

8. The cooling system of ring segment according to claim 2, wherein the openings of the first cooling passages are divided into three regions from the upstream to the downstream in the flow direction of the combustion gas, and arranged so that the arrangement pitch of the openings becomes smaller or the opening area of the openings becomes larger in a first region furthest on the upstream than the other regions, arranged so that the arrangement pitch of the openings becomes larger or the opening area of the openings becomes smaller in a third region furthest on the downstream than the other regions, and arranged so that the arrangement pitch of the openings gradually becomes larger or the opening area of the openings gradually becomes smaller from the upstream to the downstream in a second region that is sandwiched between the first region and the third region.

9. The cooling system of ring segment according to claim 7, wherein the position on the upstream at which the second region starts is a start point and the position on the upstream at which the third region starts is an end point.

10. The cooling system of ring segment according to claim 8, wherein the position on the upstream at which the second region starts is a start point and the position on the upstream at which the third region starts is an end point.

11. The cooling system of ring segment according to claim 5, wherein the start point changes between a first start point furthest on the downstream in the flow direction of the combustion gas and a second start point furthest on the upstream in the flow direction of the combustion gas.

12. The cooling system of ring segment according to claim 1, the segment body further comprising:
 a second cavity that is arranged at the upstream end portion of the segment body in the flow direction of the combustion gas so as to be perpendicular to the axial direction of the rotating shaft;
 a second cooling passage that is provided in the axial direction of the rotating shaft and communicates from the cooling space to the second cavity; and
 a third cooling passage that is provided in the axial direction of the rotating shaft and opens from the second cavity to the combustion gas in the downstream end portion of the segment body.

13. The cooling system of ring segment according to claim 12, wherein the second cooling passage and the third cooling passage have a structure of turning back in the axial direction of the rotating shaft via the second cavity.

14. A gas turbine provided with the cooling system of ring segment recited in any one of claim 1 to claim 13.

* * * * *